March 17, 1964 J. M. SIDWELL ETAL 3,125,732
RESONANT ISOLATOR COMPOSED OF A BIASED GYROMAGNETIC ELEMENT
BETWEEN CROSSED CONDUCTORS DIFFERING IN LENGTH BY AN ODD
NUMBER OF QUARTER WAVELENGTHS TO COMMON JUNCTION
Filed Nov. 17, 1959 3 Sheets-Sheet 1

INVENTORS
JOHN MEARS SIDWELL
JOHN FRANCIS WERNER

ATTORNEYS

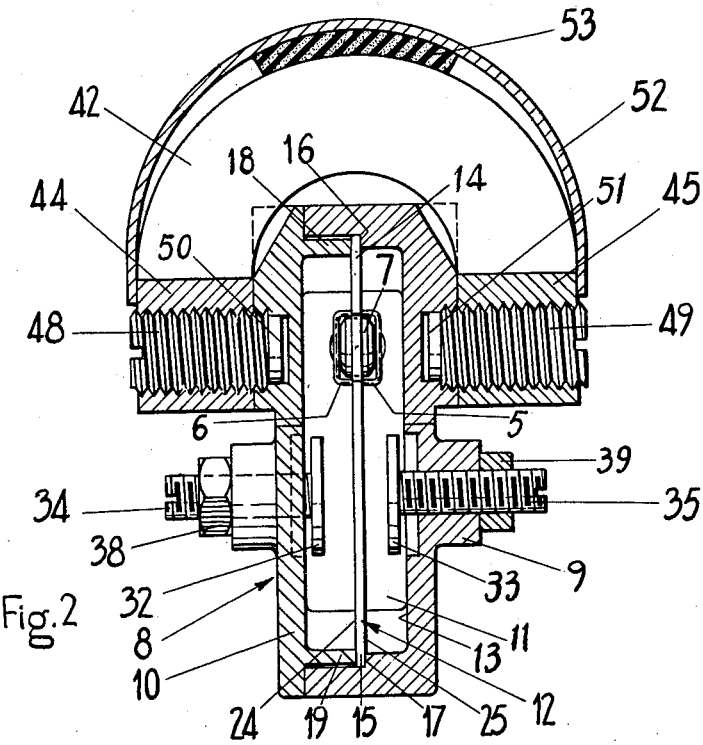
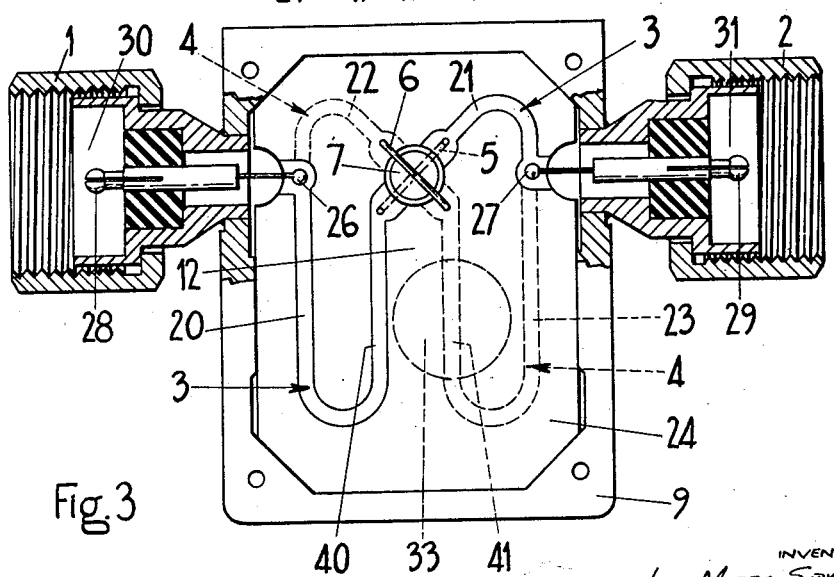

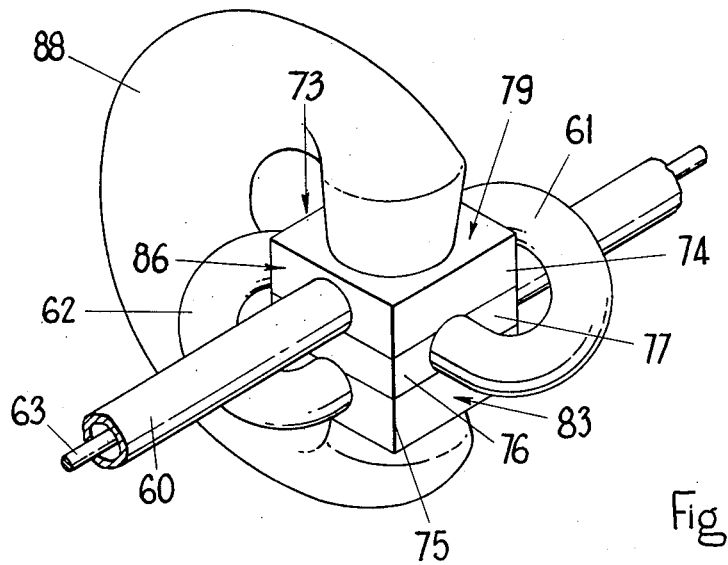
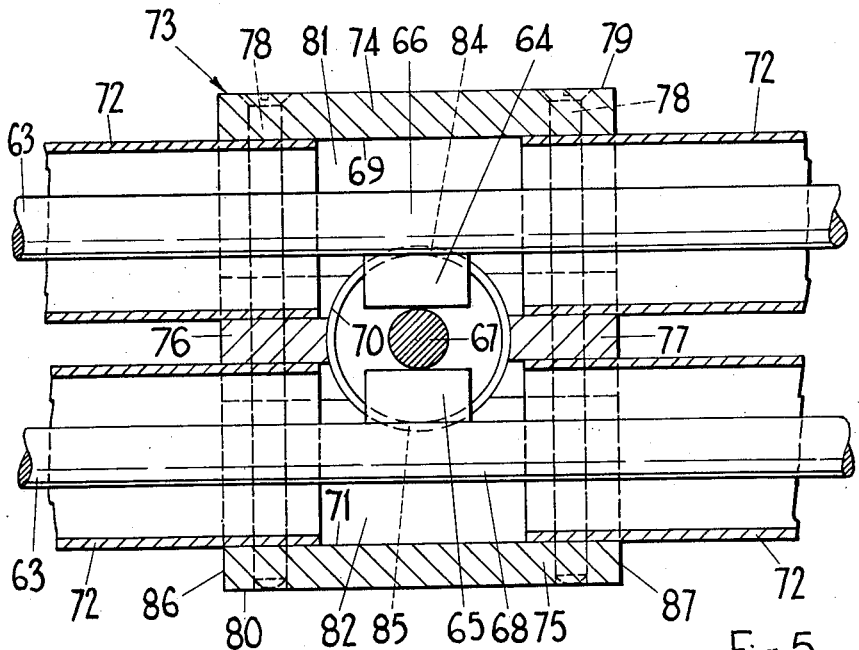

3,125,732
RESONANT ISOLATOR COMPOSED OF A BIASED GYROMAGNETIC ELEMENT BETWEEN CROSSED CONDUCTORS DIFFERING IN LENGTH BY AN ODD NUMBER OF QUARTER WAVELENGTHS TO COMMON JUNCTION
John Mears Sidwell, Middlesborough, and John Francis Werner, Wembley, England, assignors to The General Electric Company Limited, London, England
Filed Nov. 17, 1959, Ser. No. 853,639
Claims priority, application Great Britain Nov. 20, 1958
4 Claims. (Cl. 333—24.2)

This invention relates to resonance isolators.

In this specification, the term "resonance isolator" means a device which includes an electrical transmission line and which is arranged to enable electromagnetic waves to pass in one direction through the transmission line with little attenuation but to present a relatively high attenuation to electromagnetic waves passing in the opposite direction as a result of ferromagnetic resonance of material within the transmission line.

The phenomenon of ferromagnetic resonance and the "mechanism" by which a resonance isolator has a non-reciprocal transmission characteristic are discussed in an article entitled "Behaviour and Applications of Ferrites in the Microwave Region," by A. G. Fox, S.E. Miller and M. T. Weiss in the Bell System Technical Journal, volume 34, commencing at page 5.

A resonance isolator employs gyromagnetic material, such as ferrite, as the material which is subjected to ferromagnetic resonance. In such an isolator it is arranged so that, during operation, this material lies both in a steady magnetic field, which is obtained by means of a permanent magnet or an electromagnet, and in a circularly-polarised radio frequency field due to the electromagnetic waves in the transmission line. The gyromagnetic material is thus magnetised and the arrangement is such that the permeability of and the loss in this material each have different values for each direction of the radio frequency field and hence of the electromagnetic waves in the transmission line. The non-reciprocal transmission characteristic of a resonance isolator is obtained by utilising the different values of loss in the magnetised gyromagnetic material.

In the case of some types of transmission line, of which a coaxial line provides an example, a region of circularly-polarised radio frequency field does not normally exist when the energy transmitted through that line is in the dominant transverse electric mode. Such a transmission line in a resonance isolator must therefore be suitably loaded so as to provide a longitudinal component of radio frequency magnetic field which is in time quadrature with the transverse field due to the current in the line.

In the above connection, it has been proposed in a resonance isolator to load asymmetrically a coaxial line with a dielectric material. It has also been proposed to load such a coaxial line by means of short-circuited coaxial stub of length $(2n+1)\lambda/8$ so as to obtain a current in the central conductor of the stub which is at right angles to and in time quadrature with the current in the coaxial line. In the above expression and throughout this specification "$\lambda$" is the wavelength of the electromagnetic waves which are to be passed through the resonance isolator upon its operation and "$n$" is either zero or any convenient whole number.

It is an object of the present invention to provide an improved resonance isolator which includes a transmission line that is for transmitting electromagnetic energy having such a mode that a region of circularly-polarised radio frequency field does not normally exist.

According to the present invention, in a resonance isolator material that is subjected to ferromagnetic resonance during operation of the isolator is located between portions of two conductors which portions cross one another generally at right angles, each of said two conductors being one conductor of a section of transmission line and the two sections of transmission line which contain the two conductor portions respectively being connected in circuit with one another so that electric currents that are substantially in time quadrature flow in the two conductor portions upon the supply to the isolator of electromagnetic waves having the wavelength at which the isolator is to operate and a region of circularly-polarised radio frequency field is set up within the said material.

The resonance isolator may have a transmission line in which the two sections of transmission line are in series with one another. Preferably one conductor of this transmission line provides both of the conductor portions. The transmission line may be formed with a loop and the portion of the transmission line from the cross-over of the two conductor portions, around the loop to the cross-over may have an electrical length $(2n+1)\lambda/4$ so that upon the passage through the transmission line of electromagnetic waves having the wavelength "$\lambda$" the resulting electric currents in the two conductor portions are in time quadrature.

Preferably the transmission line is formed with a further loop so that a further portion of the conductor which provides the two conductor portions crosses over one of those two conductor portions generally at right angles and lies generally parallel to the other one of those two conductor portions, and material that is subjected to ferromagnetic resonance during operation of the isolator is also located between the further conductor portion and that one of the two conductor portions which is crossed by the further conductor portion, the two cross-overs being in juxtaposition and the electrical length of the further loop being such that upon the passage of electromagnetic waves of wavelength "$\lambda$" through the transmission line the resulting electric currents in the two parallel portions of conductor are substantially in phase.

With such a two loop configuration of the transmission line it is desirable that the two parallel portions of conductor have the other portion, which is generally at right angles thereto, between them.

The order of the three said portions of conductor along the length of the transmission line may be such that the two parallel portions occur one before and one after the other portion. With this order for the three said portions of conductor, the transmission line may have a configuration such that, considered from either end thereof, it describes one loop in a clockwise direction and the other loop in an anticlockwise direction. With this configuration, the electrical length of said further loop exceeds the electrical length $(2n+1)\lambda/4$ of the other loop by an amount substantially equal to an odd number of half wavelengths. Alternatively, the transmission line may have a configuration such that, considered from either end thereof, it describes both loops in the same direction. In this case both loops have substantially the same electrical length $(2n+1)\lambda/4$.

The order of the three said portions of conductor along the length of the transmission line may be such that the two said parallel portions occur one immediately after the other, in which case the transmission line may have a configuration such that, considered from either end thereof, it described one loop in a clockwise direction and the other loop in an anticlockwise direction. With this configuration the said further loop has an electrical length substantially equal to an odd number of half wavelengths.

According to another feature of the present invention, a resonance isolator has two transmission paths which each comprise two electric conductors and which are arranged so that one has a portion of one of its conductors crossed generally at right angles by a portion of a conductor of the other and each transmission path is divided by the cross-over into two parts of unequal length, and material which is subject to ferromagnetic resonance and which is located between the two said portions of conductor, each transmission path having its ends coupled electrically to an input connection and an output connection respectively of the isolator so that electromagnetic energy supplied to the input connection divides between the two paths and the electrical lengths of the parts of the transmission paths being such that upon the supply to the input connection of electromagnetic waves having the wavelength at which the isolator is to operate the resulting electric currents in the two said portions of conductor at the cross-over are substantially in time quadrature so that a region of circularly-polarised radio frequency field is set up in the vicinity of the cross-over and the resulting electric currents supplied to the output connection are substantially in phase.

Two examples of resonance isolators in accordance with the present invention will now be described by way of example with reference to the five figures of the accompanying drawings in which:

FIGURE 2 shows a cross-section on the line II—II of FIGURE 1,

FIGURE 3 shows a side elevation of part of the resonance isolator illustrated in FIGURES 1 and 2, FIGURE 4 shows diagrammatically the second example of resonance isolator, and FIGURE 5 shows a cross-sectioned elevation of part of the second example of resonance isolator and is drawn to a larger scale than FIGURE 4.

Figure 1:
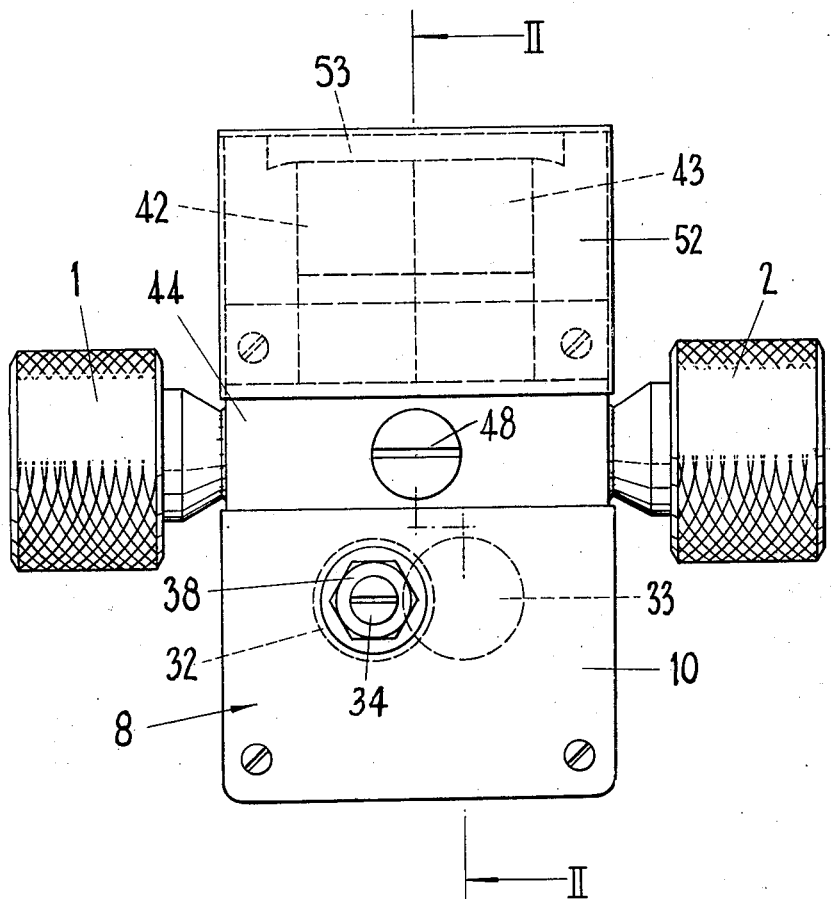
FIGURE 1 shows a side elevation of the first example of resonance isolator.

Referring to FIGURES 1, 2 and 3 of the drawings, the first example of resonance isolator employs two transmission paths which are substantially of equal length and which are both connected between input and output connectors 1 and 2. These connectors facilitate the coupling of the isolator over lengths of coaxial line (not shown) to a supply of electromagnetic waves having the wavelength "λ" for which it is designed to operate and to a load (not shown). Each transmission path comprises two conductors of which one 3 or 4 (FIGURE 3) is hereinafter referred to as the inner conductor. These inner conductors 3 and 4 include wire portions 5 and 6 that cross over one another generally at right angles. The parts of the transmission paths that are between the cross-over of the wire portions 5 and 6 and the input and output connectors 1 and 2 are arranged to have electrical lengths such that when an electromagnetic wave having the wavelength "λ" is supplied to the input connector 1 the resulting electric currents in the portions 5 and 6 are in time quadrature and a region of circularly-polarised radio frequency field is set up in the vicinity of the cross-over. The resulting electric currents that are received over the two transmission paths by the output connector 2 are in phase as the electrical lengths of these paths are arranged to be substantially equal. A disc 7 of ferrite material is located between the wire portions 5 and 6 of said inner conductor, this disc having its edges bevelled.

The resonance isolator has a hollow casing 8 comprising a member 9 having a trough-like recess formed therein and a cover plate 10 which is bolted to the member 9 so as to enclose that recess and thereby provide a generally rectangular chamber 11 within the casing 8. A thin board 12 of electrical insulating material is mounted within the chamber 11 so as to be generally parallel to and equidistant from the base wall 13 of the member 9 and the cover plate 10. In this connection the ends 14 and 15 of the board 12 are engaged between ledges 16 and 17 provided in the chamber 11 by the member 9 and flanges 18 and 19 on the cover plate 10 that project into the chamber. Thus the board 12 is held firmly in position.

The board 12, which is made of polytetrafluorethylene, carries the disc 7 of ferrite material and has metallic patterns 20, 21, 22 and 23 (FIGURE 3) of copper formed on its two principal surfaces 24 and 25. The metallic patterns 20 and 21 which are on the surface 24 of the board 12 are interconnected by the wire portion 5 and with that wire portion provide the inner conductor 3. Similarly the metallic patterns 22 and 23 which are on the surface 25 of the board 12 and the wire portion 6 which interconnects those patterns together constitute the inner connector 4. The two metallic patterns 20 and 21 or 22 and 23 and the associated wire portion 5 or 6 of either inner conductor 3 or 4 are on opposite sides of the board 12. The wire portions 5 and 6 form a cradle to retain the disc 7 of ferrite material in position in an aperture formed through the board 12.

Terminal portions 26 and 27 (FIGURE 3) of the metallic patterns 20, 21, 22 and 23 are connected electrically to the axial terminal members 28 and 29 of the input and output connectors 1 and 2. The sheath terminal members 30 and 31 of these connectors 1 and 2 are in intimate electrical contact with the casing 8 of the isolator which thus provides the second conductor of each said transmission path.

For the optimum response of the isolator upon the supply to the input connector 1 of electromagnetic waves having the wavelength "λ" it is necessary for the resulting electric currents in the wire portions 5 and 6 to be in time quadrature. It is also necessary for the electric currents supplied to the output connector 2 to be in phase agreement. To satisfy the first of these requirements it is necessary for the electrical lengths of those parts of the inner conductors 3 and 4 that are between the terminal portion 26 and the cross-over to differ by an amount equal to any odd number multiple of one quarter of the operational wavelength "λ." In the present example the metallic patterns 20 and 22 are dimensioned to make this amount as near λ/4 as is practical. To enable the amount to be brought exactly to the required value variable capacitance coupling is provided between the casing 8 and the metallic pattern 20.

To satisfy the second of the above requirements it is necessary for the electrical lengths of those parts of the inner conductors 3 and 4 that are between the cross-over and the terminal portion 27 to differ by an amount equal to any odd number multiple of one quarter of the operational wavelength "λ" and also to be such that each inner conductor 3 and 4 has effectively the same electrical length. In the present example the metallic patterns 21 and 22 are made substantially equal in length as also are the metallic patterns 20 and 23. In addition, variable capacitance coupling is provided between the casing 8 and the metallic pattern 23 so that the difference between the electrical lengths of these parts of the inner conductors 3 and 4 can be adjusted to λ/4.

The variable capacitance couplings mentioned above comprise silver plated brass discs 32 and 33 (FIGURE 2) carried on threaded rods 34 and 35 which engage tapped bores in the cover plate 10 and in the base wall 13 of the member 9 and which are provided with locknuts 38 and 39. The discs 32 and 33 are arranged to be directly over the leg portions 40 and 31 (FIGURE 3) of the metallic patterns 20 and 23 respectively.

The steady magnetic field that is required to operate the resonance isolator is provided by one or more permanent magnets depending upon the strength required for that field. In the present example two permanent magnets 42 and 43 are employed which rest on and are held by magnetic attraction to mild steel pole pieces 44 and 45 that are attached to the cover plate 10 and to the base wall 13 of the member 9. Cylindrical blind holes are formed through the pole pieces 44 and 45 and into the casing 8 so as to be coaxial with the disc 7 of ferrite material. Cylindrical plugs 48 and 49 of mild steel are arranged to screw into these holes so that their end faces 50 and 51, which are also the pole faces of the magnetic system, may be moved relatively. In this way, the strength of the magnetic field between the faces 50 and 51 can be adjusted so that the ferrite material of the disc 7 is in a condition of ferromagnetic resonance when electromagnetic waves having the wavelength "λ" are transmitted through the isolator from the input connector to the output connector. The magnets 42 and 43 are enclosed by a semi-cylindrical cover 52 of brass which is bolted to the pole pieces 44 and 45, and are held in place by a strip 53 of foamed rubber that is cemented to the cover.

Although the resonance isolator described above is designed to operate at a particular frequency it may be arranged to operate at any frequency within a wide range of frequencies. Thus one construction of this resonance isolator is designed to operate at a frequency of about 2000 megacycles per second. However it may be arranged to operate at any particular frequency within the range 1700 to 2300 megacycles per second by adjusting the strength of the steady magnetic field to give maximum attenuation of electromagnetic waves which have that particular frequency and which are passed through the isolator in the reverse direction and by adjusting the variable capacitance couplings to give minimum voltage standing wave ratio at that particular frequency. In this construction of resonance isolator the lengths of the longest and shortest parts of the inner conductor are made approximately equal to three eighths and one eighth respectively of a wavelength at the frequency of 2000 megacycles per second. The disc of ferrite material has a diameter of 6.35 millimetres and a thickness of 3.5 millimetres and is made of magnesium-manganese ferrite-aluminate having a nominal metallic composition of $Mg_{1.2}Mn_{0.165}Al_{0.4}Fe_{1.6}$. An alternative ferrite material for the disc is nickel-zinc ferrite aluminate.

The second example of resonance isolator in accordance with the present invention is shown diagrammatically in FIGURE 4. This isolator employs a length of coaxial transmission line 60 formed with two loops 61 and 62 so that the inner conductor 63 of the line twice crosses over itself, but does not make contact at either cross-over. The resonance isolator is designed to operate for the transmission of electromagnetic waves having a wavelength "λ" and the lengths of the loops 61 and 62 are chosen so that a region of circularly-polarised radio frequency field is set up in the vicinity of the cross-overs in response to the passage of such a wave through the line 60.

As may be seen from FIGURE 5, discs 64 and 65 of ferrite material are located between the portions 66, 67 and 68 of the inner conductor 63 at the cross-overs, each of these discs having its flat faces parallel to those conductor portions. The corresponding portions 69, 70 and 71 of the outer conductor 72 of the transmission line 60 are provided by a rectangular block 73 of brass which also accommodates the discs 64 and 65 of ferrite material. This material is preferably magnesium-manganese ferrite-aluminate but alternatively it may be nickel-zinc ferrite-aluminate.

The brass block 73 is in three sections of which one section is between the other two. The two outside sections comprise rectangular plates 74 and 75. The middle section of the brass block 73 is in two parts 76 and 77 which are identical in shape and which are clamped between the plates 74 and 75 by means of screws 78. The principal surfaces of the plates 74 and 75 that are parallel to the top and bottom faces 79 and 80 of the brass block 73 are each formed with a channel 81 and 82 that extends across the full length of the appertaining plate parallel to the side face 83 (FIGURE 4) of the block 73. The walls of these channels 81 and 82 are curved at a radius substantially equal to the radius of the outer conductor 72 of the line 60 and each channel has a depth somewhat greater than its radius so that its cross-section corresponds to a major segment of a circle. In addition, these principal surfaces of the plates 74 and 75 are each formed with a channel 84 and 85 that extends across the full width of the appertaining plate parallel to the end faces 86 and 87 of the brass block 73. Each of these latter channels 84 and 85 has a cross-section which corresponds to a small segment of a circle having substantially the same radius as the channels 81 and 82.

The two parts 76 and 77 which comprise the middle section of the brass block 73 and formed so as to provide the complementary portion of the channels 81, 82, 84 and 85 in the plates 74 and 75 whereby three cylindrical holes are provided through the brass block. Two of these holes lie parallel to the side face 83 of the block 73. The third hole lies between the other two and is parallel to the end faces 86 and 87 of the block. All three holes have diameters substantially equal to the diameter of the outer conductor 72 of the coaxial line 60 which is thus arranged to be a close fit therein.

The coaxial line 60 enters the brass block 73 at the end face 86. The inner conductor 63 passes through that one of the two parallel holes in the block 73 that is provided in part by the channel 81 in the plate 74. The outer conductor 72 of the line 60 extends only a short distance into each end of this hole and is clamped between the parts 74, 76 and 77 of the brass block 73 so as to be in good electrical contact with those parts. Thus within this hole, and also within each of the other two holes in the brass block 73, the outer conductor 72 of the line 60 is provided by the brass block.

The coaxial line 60 leaves the brass block 73 at the end face 87. It is then looped around to re-enter the brass block 73 at the side face 83. The inner conductor 63 passes through the hole that is parallel to the end faces 86 and 87 of the block 73 and the coaxial line 60 re-emerges from the other one of the side faces. Thus the inner conductor 63 crosses over itself generally at right angles within the brass block 73. The length $l$ of the line 60 from this cross-over around the loop and back to the cross-over is governed by the formula $l=(2n+1)\lambda/4$.

The coaxial line 60 is again looped around to re-enter the block at its end face 86. The inner conductor 63 passes through that one of the two parallel holes in the block 73 that is provided in part by the channel 82 in the plate 75 and the coaxial line 60 finally emerges from the end face 81. Thus the inner conductor 63 again crosses over itself generally at right angles within the brass block 73. The length of the line from this cross-over, around the loop 62 and back to the cross-over is made an odd number of half wavelengths greater than the length $l$ of the loop 61.

For the purpose of providing the steady magnetic field that is required to operate the resonance isolator, a permanent magnet 88 is provided. This magnet 88 is positioned so that one of its pole faces is in engagement with the top face 79 of the brass block 73 and its other pole face is in engagement with the bottom face 80 of that block. The magnitude of the steady magnetic field is chosen so that the ferrite material of the discs 64 and 65 is in the condition of ferromagnetic resonance when a wave having the frequency at which the isolator is to be used is transmitted in the appropriate direction along the coaxial line 60.

In one construction of the resonance isolator described above that is designed to operate at a frequency of about 2000 megacycles per second, the dimensions of the isolator are as follows:

Discs of ferrite material—
 Diameter _____ mm__ 6.35
 Thickness _____ mm__ 3.5
Coaxial line (air filled)—
 Diameter of outer conductor _____ mm__ 11
 Diameter of inner conductor _____ mm__ 4
 Length of first loop=$9\lambda/=313$ mm.
 Length of second loop=$9\lambda/4+\lambda/2=382.5$ mm.

The steady magnetic field is adjusted to a value of about 900 oersteds.

The resonance isolator that is described above may be modified by the use of alternative configuration for the coaxial line. Thus in one of these configurations, the coaxial line enters the brass block 73 at its end face 86, emerges at the other end face 87 and is looped around to re-enter the block at its side face 83. On emerging from the other side face the line is again looped around so as to re-enter the block at the end face 81 and finally emerges at the end face 86. With this configuration the length $l$ of each loop in the line is governed by the formula $l=(2n+1)\lambda/4$.

In yet another of these alternative configurations, the coaxial line enters the brass block at its side face 83, emerges at the other side face and is looped around to re-enter the block at its end face 87. On emerging from the other end face 86 it is doubled back in a second loop to re-enter the block at the same end face 86 from which it emerged, and finally re-emerges from the end face 87. With this configuration, the length of the first loop in the coaxial line is given by the formula $(2n+1)\lambda/4$ and the length of the second loop is given by the formula $(2m+1)\lambda/2$ where "$m$" like "$n$" is either zero or any convenient whole number.

With any of the configurations of the coaxial line that are described above, it is found that the band of frequencies over which satisfactory operation of the resonance isolator is obtained depends upon the lengths of the loops, long loops giving a narrower frequency band than short loops. It will be appreciated that an isolator becomes completely inoperative for frequencies at which the length of a loop is a multiple of a half wavelength.

We claim:

1. A resonance isolator comprising two elongated conductors, means to mount the two conductors so that a portion of one conductor and a portion of the other conductor cross one another generally at right angles, a conductive member insulated from said conductors and forming therewith two two-conductor transmission structures each arranged to support and propagate electromagnetic energy waves, an input termination comprising two terminal portions of which one is connected to said conductive member and the other is connected to said conductors so that the electrical distances between said input termination and said portions of said conductors at their cross-over differ by substantially an odd number of quarter wavelengths for wave energy supplied to said isolator, an output termination comprising two terminal portions of which one is connected to said conductive member and the other is connected to said conductors so that the electrical distances between said input and output terminations through said two transmission structures are substantially equal, an element of magnetically polarizable material exhibiting the gyromagnetic effect at the frequency of said wave energy and supported between said crossing portions of said conductors, and means for applying a steady magnetizing field to said element.

2. A resonance isolator according to claim 1 wherein a board of electrical insulating material is supported by the conductive member and has an aperture therethrough in which is situated the element of magnetically polarizable material, wherein the portions of the conductors comprise wires which are supported by said board and which extend across said aperture on each side of said board to retain said element in position, and wherein the remaining portions of said conductors are constituted by metallic patterns formed on said board.

3. A resonance isolator according to claim 1 wherein two coupling members are supported by the conductive member and are each arranged for movement relative to a different one of the two conductors so as to provide variable capacitance coupling between said conductive member and said conductors whereby the electrical length of each transmission structure is independently variable.

4. A resonance isolator comprising three elongated conductors, means to mount the three conductors so that a portion of a first one of the conductors and a portion of a second one of the conductors are generally parallel to one another and a portion of the third one of the conductors lies between and generally at right angles to said portions of said first and second conductors, a conductive member insulated from said conductors and forming therewith three two-conductor transmission structures each arranged to support and propagate electromagnetic energy waves, coaxial transmission lines connecting each of the ends of the particular transmission structure having said third conductor to a different one of the other two said transmission structures so that said coaxial lines and said transmission structures together provide a single transmission path along which said portions of said conductors are spaced at distances such that electric currents of wave energy supplied to said isolator that flow in said portions of said first and second conductors are substantially in phase with one another but are generally in time quadrature with such currents in said portion of said third conductor, two elements which are of magnetically polarizable material exhibiting the gyromagnet effect at the frequency of said wave energy and of which one is supported between said portions of said first and third conductors where they cross one another and the other is supported between said portions of said second and third conductors where they cross one another, and means for applying a steady magnetizing field to said elements.

References Cited in the file of this patent

UNITED STATES PATENTS

| 2,755,447 | Engelmann | July 17, 1956 |
| 2,892,161 | Clogston | June 23, 1959 |

FOREIGN PATENTS

| 216,563 | Australia | Aug. 6, 1958 |
| 1,041,549 | Germany | Oct. 23, 1958 |

OTHER REFERENCES

"Electrical Manufacturing," February 1959, pages 61–63.